US 6,676,326 B2

(12) United States Patent  (10) Patent No.: US 6,676,326 B2
Wu  (45) Date of Patent: Jan. 13, 2004

(54) SQUARE LAMP POST INSERTIONAL CONJOINMENT STRUCTURE

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 09/887,071

(22) Filed: Jun. 25, 2001

(65) Prior Publication Data

US 2002/0197106 A1 Dec. 26, 2002

(51) Int. Cl.[7] .................................................. F16B 7/10
(52) U.S. Cl. ...................... 403/329; 403/9; 403/109.3; 403/109.8; 403/298
(58) Field of Search ................................. 403/329, 377, 403/298, 109.3, 359.5, 9, 109.2, 109.7, 109.8, 316, 317, 326, DIG. 4, DIG. 14

(56) References Cited

U.S. PATENT DOCUMENTS

| 1,824,192 | A | * | 9/1931 | Bouma | 403/109.3 |
| 2,538,448 | A | * | 1/1951 | Finley | 403/109.3 |
| 4,068,333 | A | * | 1/1978 | Gutner | 403/329 |
| 4,299,421 | A | * | 11/1981 | Bontrager | 403/109.3 |
| 4,431,331 | A | * | 2/1984 | Brody | 403/329 |
| 4,819,293 | A | * | 4/1989 | Nicholson | 403/109.3 |
| 5,127,762 | A | * | 7/1992 | Havlovitz | 403/298 |
| 5,144,780 | A | * | 9/1992 | Gieling et al. | 403/292 |
| 5,387,048 | A | * | 2/1995 | Kuo | 403/328 |
| 5,829,910 | A | * | 11/1998 | Kameyama | 403/329 |

* cited by examiner

Primary Examiner—Lynne H. Browne
Assistant Examiner—Kenn Thompson
(74) Attorney, Agent, or Firm—Troxell Law Office PLLC

(57) ABSTRACT

A square lamp post insertional conjoinment structure comprised of a slip-mount tube and a casing tube fitted onto the slip-mount tube. The slip-mount tube has disposed at one end an internal binding sleeve and, furthermore, an insertional conjoinment section of a stepped arrangement is formed between the exterior of the internal binding sleeve and the interior of the slip-mount tube at two opposing sides and a spring is installed in each insertional conjoinment section. The casing tube has engagement blocks aligned with the springs. When the casing tube is fitted onto the slip-mount tube, its engagement blocks press inward against the springs to facilitate the sleeving on of the casing tube. After the casing tube engagement blocks have passed the springs, the springs rebound to their original positions, locking the casing tube onto the slip-mount tube and thereby achieving the fixed coupling of the casing tube and the slip-mount tube.

1 Claim, 7 Drawing Sheets

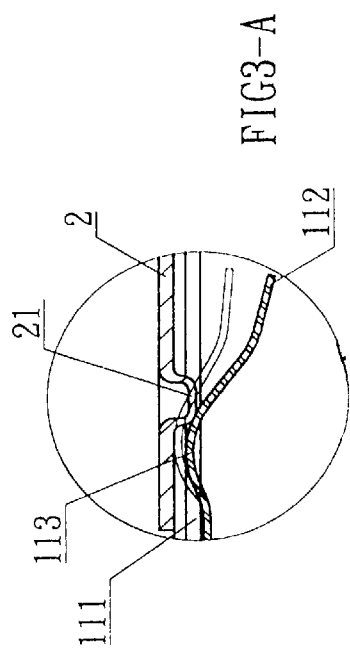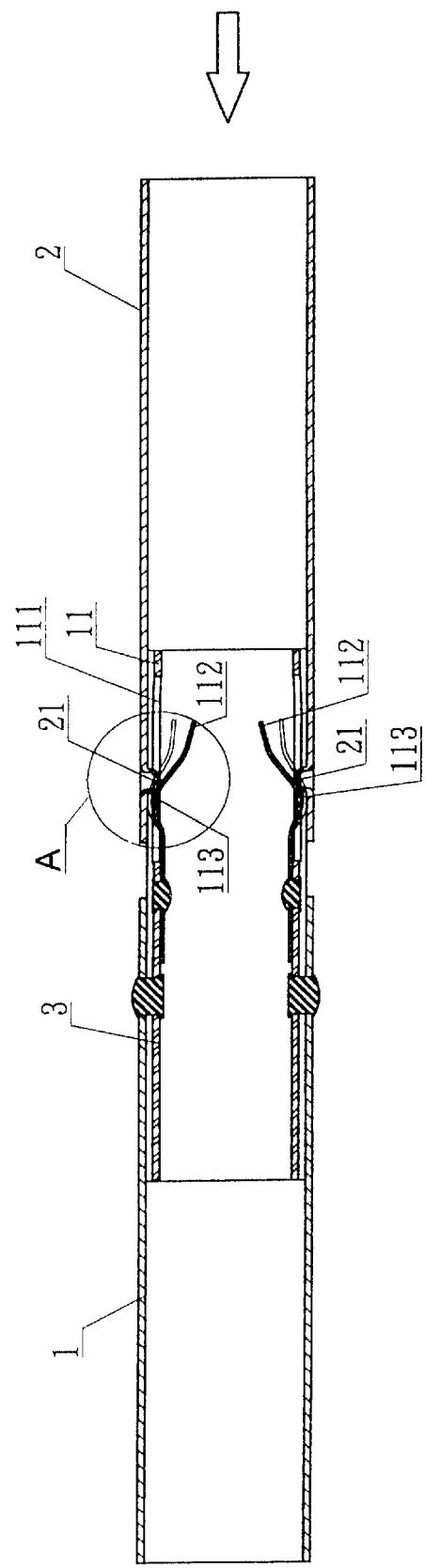

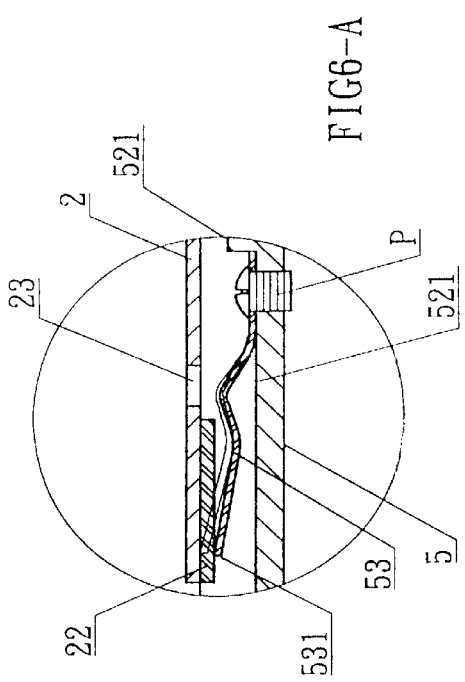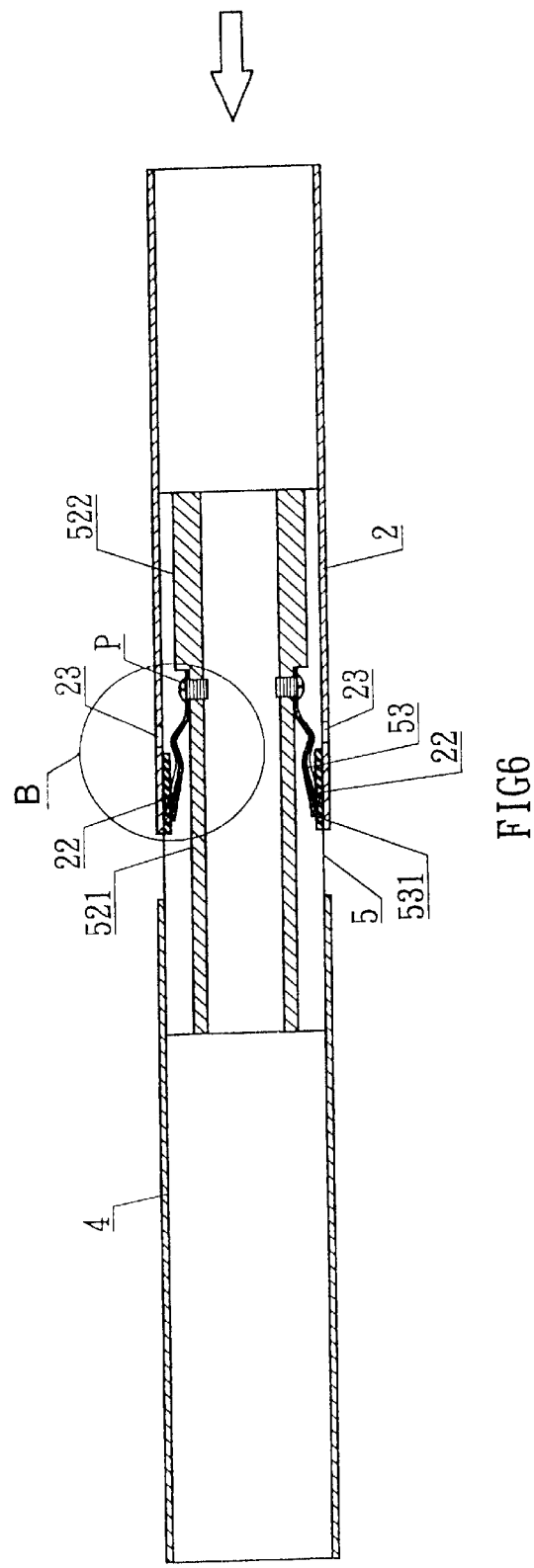

SQUARE LAMP POST INSERTIONAL CONJOINMENT STRUCTURE

BACKGROUND OF THE INVENTION

Field of the Invention

The invention herein relates to a square lamp post insertional conjoinment structure in which a slip-mount tube has disposed at one end an internal binding sleeve, an insertional conjoinment section of a stepped arrangement is formed between it and the slip-mount tube at two opposing sides and, furthermore, a spring is installed at each of the insertional conjoinment sections; a casing tube has engagement blocks aligned with and capable of pressing inward against the springs such that after the casing tube is fitted onto the slip-mount tube, the springs rebound to their original positions, locking the casing tube onto the slip-mount tube and thereby achieving the fixed coupling of the casing tube and the slip-mount tube.

SUMMARY OF THE INVENTION

The primary objective of the invention herein is to provide a square lamp post insertional conjoinment structure comprised of a slip-mount tube and a casing tube fitted onto the slip-mount tube, wherein the said slip-mount tube has disposed at one end an internal binding sleeve and, furthermore, an insertional conjoinment section of a stepped arrangement is formed between the exterior of the internal binding sleeve and the interior of the slip-mount tube at two opposing sides; a recess is formed in each of insertional conjoinment sections and, furthermore, a spring is riveted to the bottom of each recess; the casing tube has engagement blocks aligned with the springs such that when the said casing tube is fitted onto the slip-mount tube, its engagement blocks press inward against the springs to facilitate the sleeving on of the casing tube; after the casing tube engagement blocks pass the springs, the springs rebound to their original positions, locking the casing tube onto the slip-mount tube and thereby achieving the fixed coupling of the casing tube and the slip-mount tube.

BRIEF DESCRIPTION OF THE DRAWINGS

FIG. 3 is a cross-sectional drawing of the assembled embodiment of the invention herein (1).

FIG. 3A is an enlarged cross-sectional view of area A in FIG. 3.

FIG. 6 is a cross-sectional drawing of the second assembled embodiment of the invention herein (1).

FIG. 6A is an enlarged cross-sectional view of area B in FIG. 6.

DETAILED DESCRIPTION OF THE INVENTION

Figure 1:
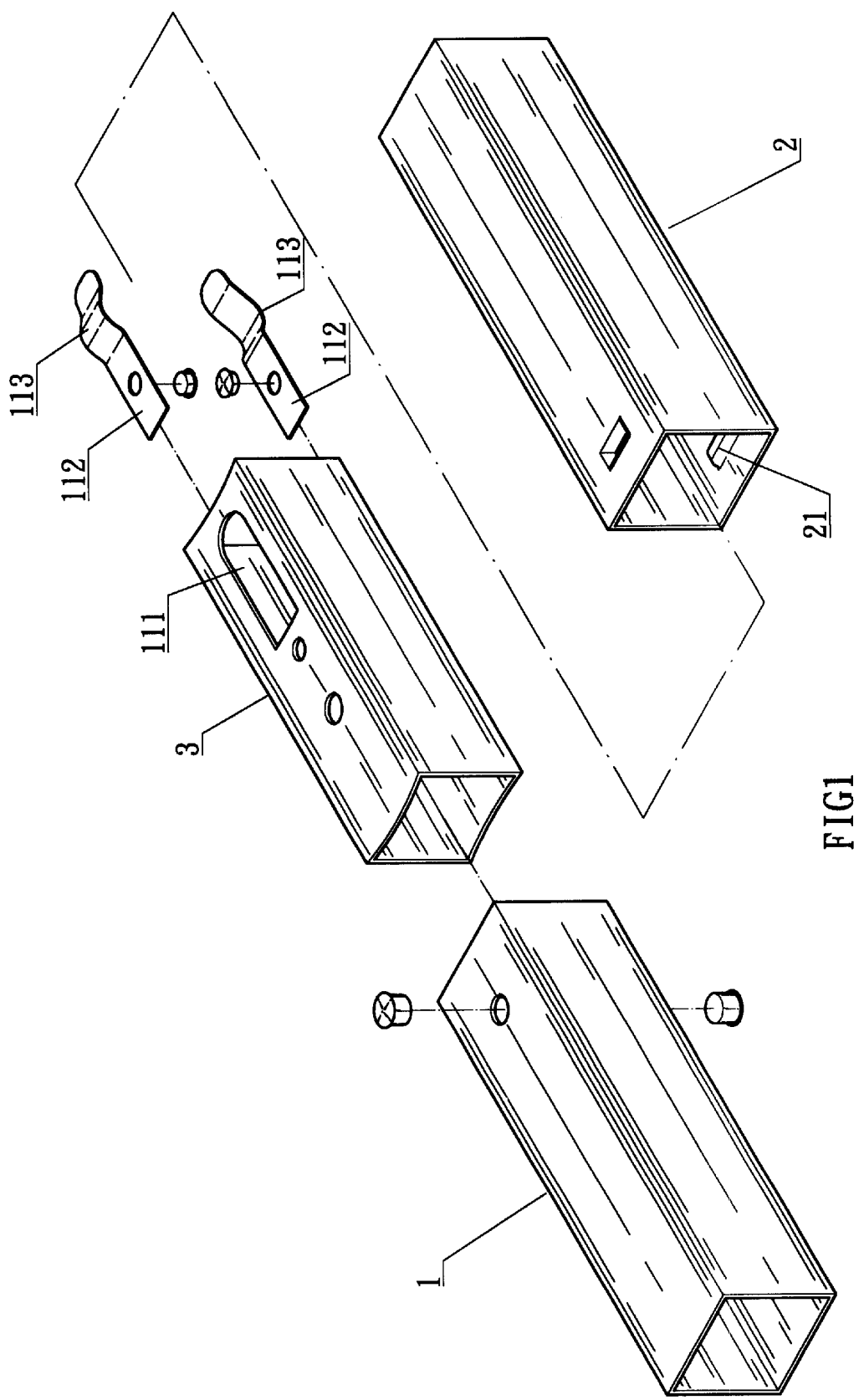
FIG. 1 is an exploded drawing of the invention herein.
Figure 2:
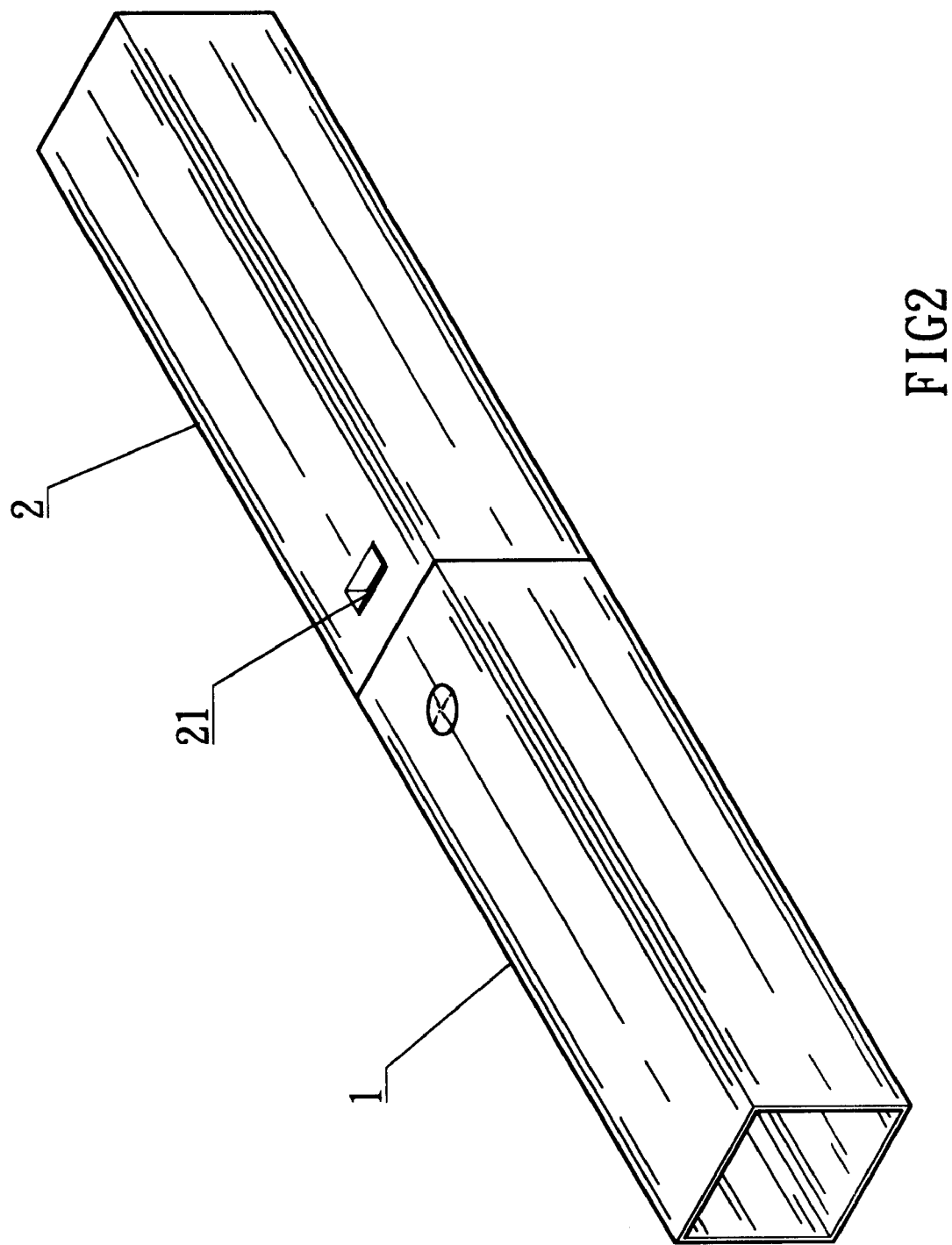
FIG. 2 is an isometric drawing of the invention herein.

Referring to FIG. 1 and FIG. 2, the structural arrangement of the invention herein, the present invention is comprised of a slip-mount tube 1 and a casing tube 2 fitted onto the slip-mount tube 1, of which:

The said slip-mount tube 1 has disposed at one end an internal binding sleeve 3 that is situated inside the slip-mount tube 1 and, furthermore, an insertional conjoinment section 11 of a stepped arrangement is formed between the exterior of the internal binding sleeve 3 and the interior of the slip-mount tube 1 at two opposing sides; a recess 111 is formed in each of the insertional conjoinment sections 11 and, furthermore, a spring 112 is riveted to the bottom of each recess 111; each said spring 112 is straight at both extremities and the center section is raised into a convexity to form a semicircular catch end 113, the straight extremities of which are fastened to the bottoms of the recesses 11 such that the catch ends 113 project slightly outward from the recesses 111.

The said casing tube 2 has an inner diameter that is equal to the outer diameter of the insertional conjoinment sections 11 to enable its ensleeving over the insertional conjoinment sections 11 as well as engagement blocks 21 aligned with the spring 112 catch ends 113 on the slip-mount tube 1 that push inward against the springs 112.

Figure 4:
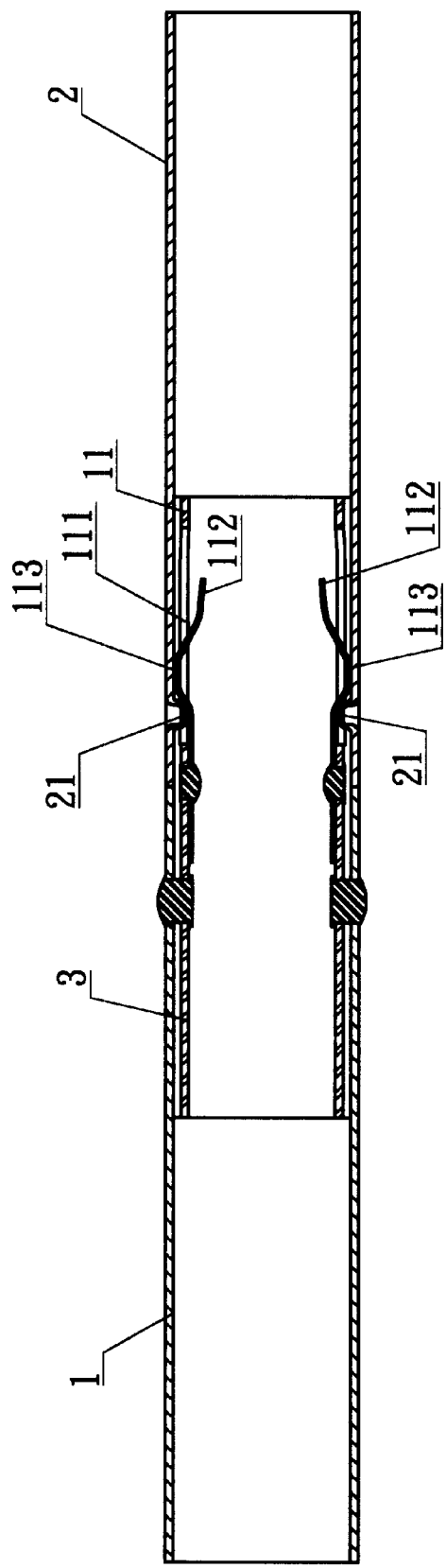
FIG. 4 is a cross-sectional drawing of the assembled embodiment of the invention herein (2).

Referring to FIGS. 3, 3A and 4, the cross-sectional drawings of the invention herein, when the said casing tube 2 is fitted onto the slip-mount tube 1, the casing tube 2 engagement blocks 21 press inward against the springs 112 to facilitate the sleeving on of the casing tube 2 (as shown in FIG. 3); after the casing tube 2 engagement blocks 21 pass the spring catch ends 113, the springs 112 rebound to their original positions as structurally characteristic, locking the casing tube 2 onto the slip-mount tube 1 and thereby achieving the fixed coupling of the casting tube 2 and the slip-mount tube 1 (as shown in FIG. 4); since the catch ends 113 are of a curved structural arrangement, after a sufficient magnitude of force is applied to the casing tube 2, the engagement blocks 21 push against the spring catch ends 113 once again to enable the removal of the casing tube 2, thereby constituting an insertional conjoinment structure in which casing tube 2 removal is accomplished by the direct application of force.

Figure 5:
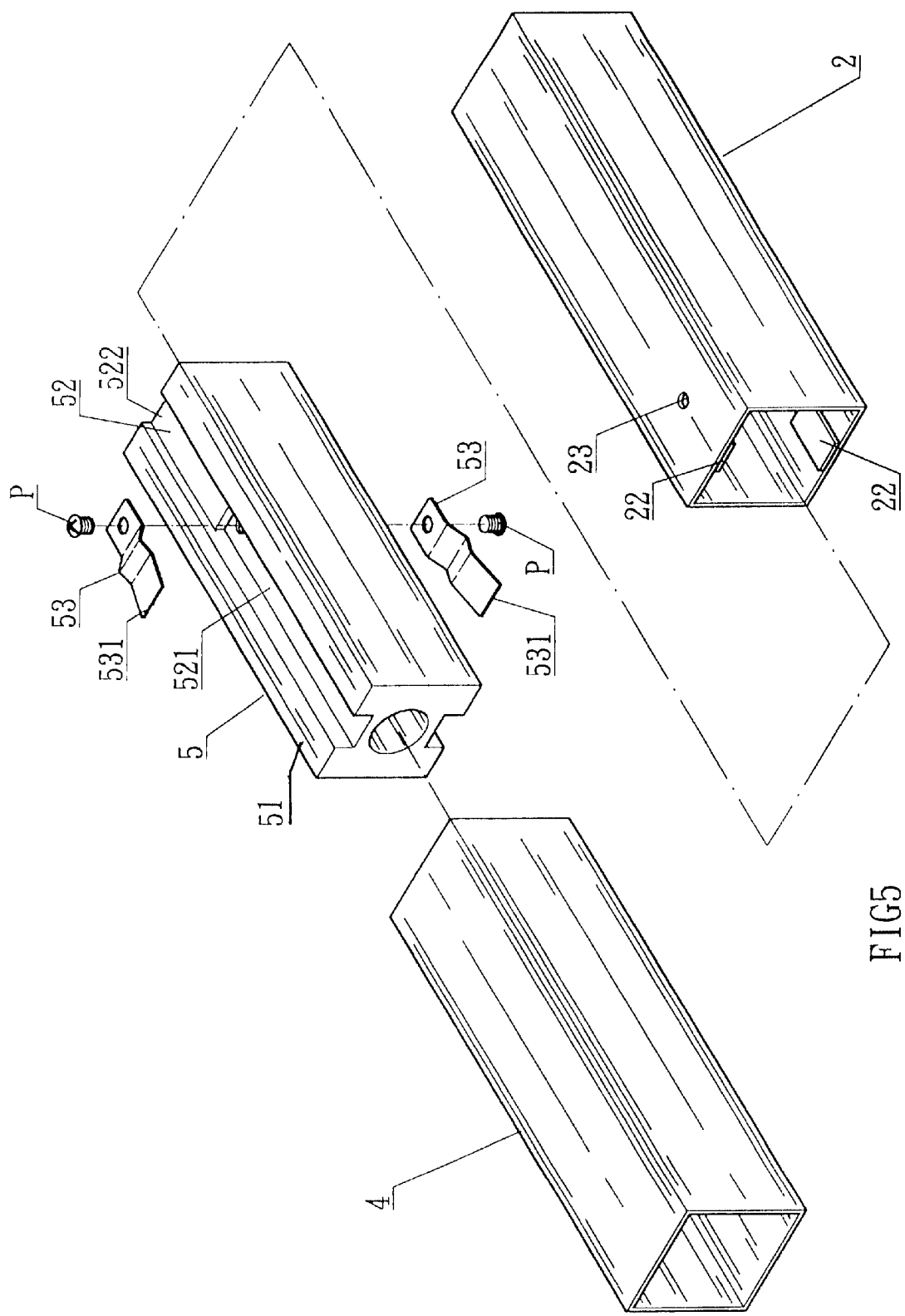
FIG. 5 is an exploded drawing of another embodiment of the invention herein.

Referring to FIG. 5, the drawing of another embodiment of the invention herein, the said slip-mount tube 4 has disposed at one end an internal binding sleeve 5 that is situated inside the slip-mount tube 4 and, furthermore, an insertional conjoinment section 51 of a stepped arrangement is formed between the exterior of the internal binding sleeve 5 and the interior of the slip-mount tube 4 at two opposing sides, and a slide track 52 is formed along each insertional conjoinment section 51; the said slide tracks 52 have a tiered surface and a spring 53 is fastened by a screw P to each of its lower level planes 521 and, furthermore, the height of the screw P is slightly less than that of its higher level planes 522 so that the casing tube 2 is not obstructed by the screws P during the course of travel; the one extremity of the springs 53 fastened by the screws P to the lower level planes 521 is straight and fixed flat against the slide tracks 52, while the other extremity is contoured such that it projects slightly above the higher level plane 522 to form detent ends 531.

The said casing tube 2 has an inner diameter that is equal to the outer diameter of the insertional conjoinment sections 51 to enable its ensleeving over the insertional conjoinment sections 51 as well as engagement blocks 22 aligned with the spring 53 detent ends 531 on the slip-mount tube 4 that push inward against the springs 53 as they travel over the higher stepped planes 522.

Figure 7:
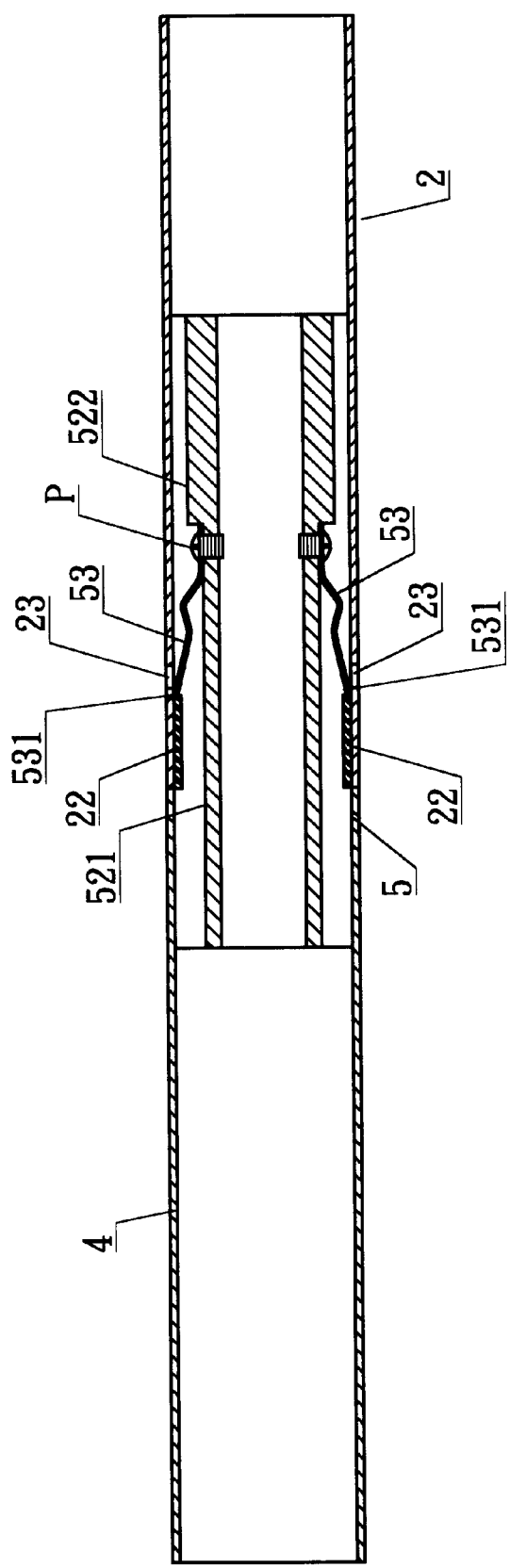
FIG. 7 is a cross-sectional drawing of the second assembled embodiment of the invention herein (2).

Referring to FIGS. 6, 6A and 7, which illustrate the operating method, when the casing tube 2 is fitted onto the slip-mount tube 5, the casing tube 2 engagement blocks 22 press inward against the springs 53 to facilitate the sleeving on of the casing tube 2 (as shown in FIG. 6); after the casing tube 2 engagement blocks 22 pass the spring 53 detent ends 531, the springs 53 rebound to their original positions as structurally characteristic and latch onto the rear ends of the engagement blocks 22, thereby achieving the fixed coupling of the casing tube 2 and the slip-mount tube 1 (as shown in FIG. 7); furthermore, after the said casing tube 2 is fitted onto the slip-mount tube 1, it cannot be pulled off by a direct application of force alone because the springs 53 are retained against the rear ends of the engagement blocks 22 and, therefore, a tool must be utilized to simultaneously depress the both springs 53 at the two sides of the slip-mount tube 1 in order to pull of the casing tube 2, thereby constituting an insertional conjoinment structure in which casing tube 2 removal cannot be accomplished by the direct application of force.

What is claimed is:

1. A square lamp post conjoining structure comprising:

a slip-mount tube;

an internal binding sleeve having a first end inserted inside one end of the slip-mount tube, the internal binding sleeve having a slide track formed along each of two opposing sides, each slide track having a tiered bottom surface located below a plane of the associated side;

a spring mounted to a lower level of the tiered bottom surface, each spring having a first portion that is straight and fixed in the slide track and a second portion that is contoured so as to project above a higher level of the tired bottom surface to form a detent end; and a casing tube fitting over a second end of the internal binding sleeve, and having engagement blocks disposed on two opposite interior sides, such that the detent ends of the springs slide over the engagement blocks as the casing tube is slid over the second end of the interior binding sleeve, such that the detent ends engage the engagement blocks thereby securing the casing tube in a fixed position.

* * * * *